United States Patent
Romas et al.

(10) Patent No.: US 9,248,850 B1
(45) Date of Patent: Feb. 2, 2016

(54) WHEELBARROW WITH AN ASSISTED LIFT DUMPING BARROW

(71) Applicants: Brian Romas, Avon, IN (US); John Lynn, Plainfield, IN (US)

(72) Inventors: Brian Romas, Avon, IN (US); John Lynn, Plainfield, IN (US)

( * ) Notice: Subject to any disclaimer, the term of this patent is extended or adjusted under 35 U.S.C. 154(b) by 0 days.

(21) Appl. No.: 14/546,570

(22) Filed: Nov. 18, 2014

(51) Int. Cl.
  *B62B 1/18* (2006.01)
  *B62B 1/24* (2006.01)
  *B62B 3/08* (2006.01)

(52) U.S. Cl.
  CPC ... *B62B 1/24* (2013.01); *B62B 1/18* (2013.01); *B62B 3/08* (2013.01)

(58) Field of Classification Search
  CPC ............ B62B 1/18; B62B 1/186; B62B 1/20; B62B 1/202; B62B 1/22; B62B 1/24; B62B 3/08
  See application file for complete search history.

(56) References Cited

U.S. PATENT DOCUMENTS

| | | | |
|---|---|---|---|
| 726,931 A | 5/1903 | Hull | |
| 1,063,112 A | 6/1913 | Brand | |
| 1,497,478 A * | 6/1924 | Bludworth | 298/3 |
| 2,037,222 A | 4/1936 | Farrar | |
| 2,770,491 A * | 11/1956 | Perko | B62B 1/24 298/1 C |
| 2,852,304 A | 9/1958 | Harrison | |
| 2,973,224 A | 2/1961 | Wall, Sr. | |
| 3,092,418 A | 6/1963 | Themascus | |
| 3,323,837 A * | 6/1967 | Landry | 298/2 |
| 3,348,714 A * | 10/1967 | Ash | 414/489 |
| 4,270,786 A | 6/1981 | Mattox | |
| RE33,131 E * | 12/1989 | Morrison | 298/1 H |
| 5,350,030 A * | 9/1994 | Mawhinney et al. | 180/19.3 |
| 6,390,496 B1 * | 5/2002 | Eicher | 280/653 |
| 6,886,838 B1 | 5/2005 | Zimmerman | |
| 7,309,072 B2 * | 12/2007 | Storm | 280/79.2 |
| 7,396,027 B1 * | 7/2008 | Lovmark | 280/47.34 |
| 7,547,026 B2 | 6/2009 | Morris | |
| 7,775,531 B2 | 8/2010 | Zimmerman | |
| 7,818,847 B1 * | 10/2010 | Hermann | 16/430 |
| 7,937,859 B2 | 5/2011 | Downes | |
| 8,474,855 B2 | 7/2013 | Kilen | |
| 2006/0033311 A1 * | 2/2006 | Lim | 280/653 |
| 2008/0265537 A1 * | 10/2008 | Lin | 280/47.31 |

* cited by examiner

Primary Examiner — Katy M Ebner
Assistant Examiner — Emma K Frick
(74) Attorney, Agent, or Firm — Bruce J. Bowman

(57) ABSTRACT

A wheelbarrow has an assisted lift dumping barrow that provides continuously biased forward tilting of the barrow relative to the frame of the wheelbarrow through two gas springs while maintaining the legs and wheel thereof on the ground. A first gas spring is connected to a right side handle of the frame of the wheelchair and to a right rear underside of the barrow. A second gas spring is connected to a left side handle of the frame of the wheelbarrow and to a left rear underside of the barrow. Each gas spring provides a continuous bias or pressure against the rear of the barrow for assisting in pivoting and lifting the rear of the barrow for dumping its contents. A latch keeps the barrow from raising until released. A separate rear barrow handle aids in overcoming bias of the gas springs for lowering the rear of the barrow.

9 Claims, 7 Drawing Sheets

WHEELBARROW WITH AN ASSISTED LIFT DUMPING BARROW

BACKGROUND OF THE INVENTION

1. Field of the Invention

The present invention relates to wheelbarrows and, more particularly, to wheelbarrows whose barrow can be caused to dump while the wheel and frame thereof are maintained on the ground.

2. Background Information

Wheelbarrows to manually haul material have been in use for a long time. While wheelbarrows are generally an efficient way to move material from one point to another, a recognized problem is the ability to easily and/or precisely dump the contents of the barrow rather than merely unload its contents. This is because the barrow of a traditional wheelbarrow is fixed to the frame. Therefore, the frame must be lifted and tilted relative to its wheel in order to dump the barrow's contents. Because the load within the barrow can be 200 to 300 pounds, it may be difficult for even a strong individual to manually lift and/or tilt the wheelbarrow in order to dump its contents at a particular spot. Even when the load is light, it may not be easy for some individuals to lift and tilt the entire wheelbarrow in order to dump the contents from the barrow.

In view of the above problem, various wheelbarrows have been designed throughout the years with dumping barrows. Some of these wheelbarrows are shown and described in the following U.S. Pat. Nos. 726,931; 1,063,112; 2,037,222; 2,852,304; 2,973,224; 3,092,418; 4,270,786; 6,886,838; 7,547,026; 7,775,531; 7,937,859; and 8,474,855. While these wheelbarrows all have dumping barrows, the manner in which dumping is achieved is, of course, different for each patent. Given the variety of dumping wheelbarrows, it is apparent that they must be deficient in some respects. A review of the various patented dumping mechanisms shows that it would still take an individual of particular strength to operate the dumping mechanisms and thus dump the barrow's contents.

U.S. Pat. No. 4,270,786, however, recognized the aforementioned problem and thus provides a wheelbarrow in which a hydraulic piston is used to assist in forward tilting (dumping) of the pivoting barrow of the wheelbarrow. While the hydraulic piston tilts the barrow forward regardless of the weight of the barrow's contents, the wheelbarrow suffers from several deficiencies that makes its use undesirable in many situations. Particularly, the frame of the wheelbarrow must be heavy in order to support a hydraulic piston. The heavier the frame, the harder it is to lift the wheelbarrow via its handles and wheel (move) the wheelbarrow. Also, the single, center mounted hydraulic piston makes it inherently unstable during dumping of various types of barrow contents. Moreover, the user does not have complete control of the wheelbarrow or barrow during dumping since the user has to operate the hydraulic pump for the hydraulic piston. Furthermore, the use of hydraulic fluid is problematic in many respects. All of these deficiencies therefore makes its use undesirable.

In view of the above, there is a need for an improved assisted lift dumping wheelbarrow that overcomes the deficiencies of the prior art.

It is therefore an object of the present invention to provide an improved assisted lift dumping wheelbarrow that overcomes the deficiencies of the prior art.

BRIEF SUMMARY OF THE INVENTION

The present invention is an assisted lift dumping wheelbarrow having a forwardly pivoting barrow, and left and right biasing members that normally exert a force against the left and right rear underside of the barrow to forward tilt the barrow relative to the wheelbarrow wheel for dumping the contents of the barrow. A latch system retains the rear of the barrow onto the wheelbarrow frame against the normal bias of the left and right biasing members when not dumping. A handle is provided at the rear of the barrow to aid in overcoming the bias of the left and right biasing members when lowering the rear of the barrow for latching.

In one form, the left and right biasing members are left and right gas springs, pistons, cylinders, or shocks. Because gas springs are made with different biasing strengths or forces, the amount of biasing force applied against the rear of the barrow may be easily changed as desired, needed, or required by replacing the gas spring. In this regard, the frame and underside of the barrow have left and right mounting brackets for easily attaching the left and right gas springs to the wheelbarrow.

In one form, the latch system includes a spring loaded latch mounted to the underside of the barrow, preferably, but not necessarily, generally midway between the left and right sides of the barrow. The latch is operatively connected to an actuation lever mounted to the barrow handle that controls opening and closing of the latch, and thus the raising or lifting of the rear of the barrow and the holding or retention of the rear of the barrow. A retention bar associated with the wheelbarrow frame receives the latch thereby holding the rear of the barrow onto the frame.

The barrow is pivotally attached to the front of the wheelbarrow frame via a pivot rod that extends through left and right pivot brackets mounted to the left and right front underside of the barrow and a pivot tube connected to and between the front of the wheelbarrow frame. The barrow can be easily removed from the frame by removing the pivot rod.

The present assisted lift dumping wheelbarrow optionally includes a foot lever attached to the rear of the barrow to aid in overcoming the bias of the left and right biasing members when lowering the rear of the barrow for latching.

The present invention will be more apparent upon reading the following detailed description in conjunction with the accompanying drawings.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Like reference numerals indicate the same or similar parts throughout the several figures.

Figure 1:
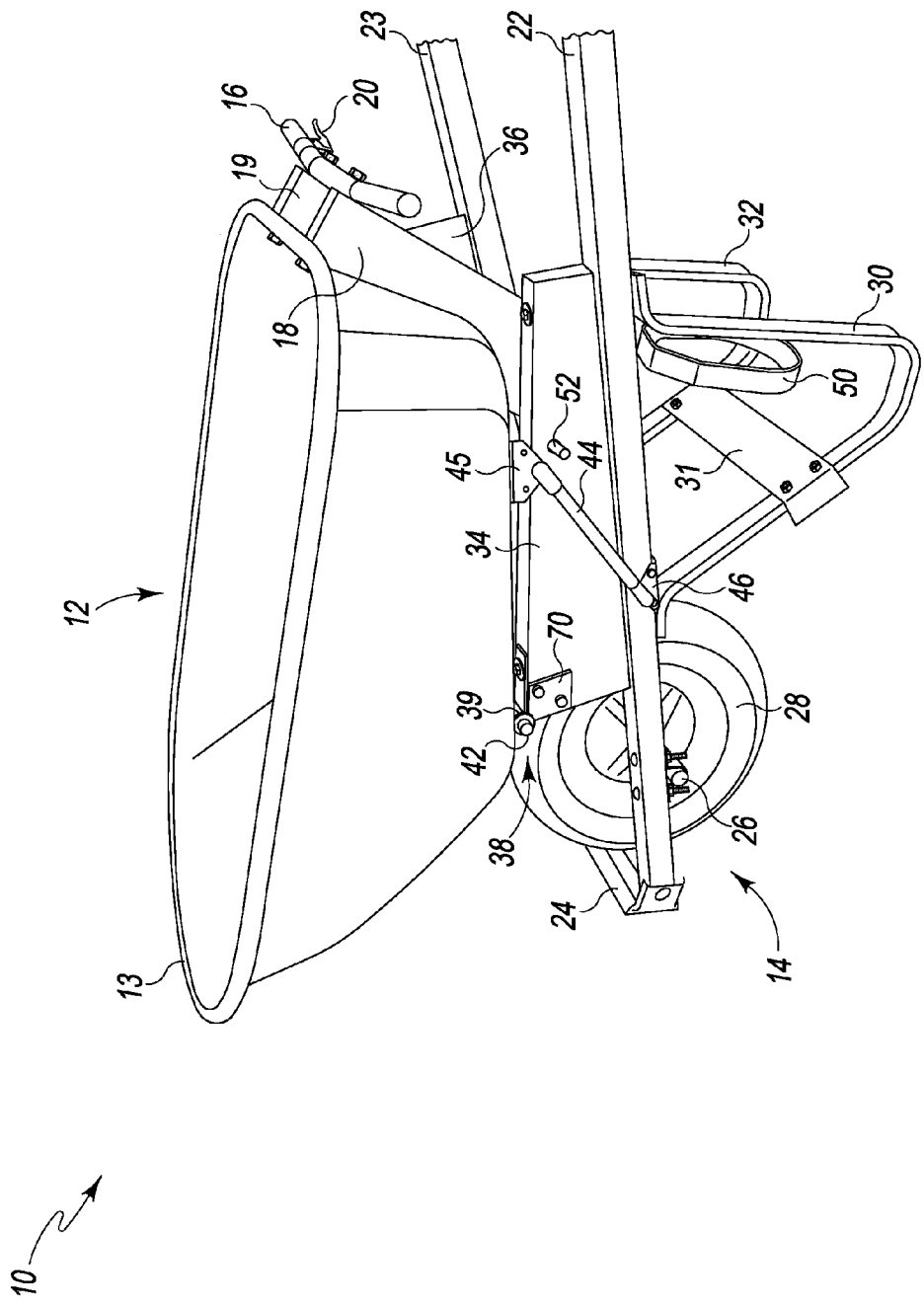
FIG. 1 is an isometric view of the left side of an exemplary embodiment of a wheelbarrow with an assisted lift dumping barrow fashioned in accordance with the present principles.

A detailed description of the features, functions and/or configuration of the components depicted in the various figures will now be presented. It should be appreciated that not all of the features of the components of the figures are necessarily described. Some of these non-discussed features as well as discussed features are inherent from the figures. Other non-discussed features may be inherent in component geometry and/or configuration.

DETAILED DESCRIPTION OF THE PREFERRED EMBODIMENT

Referring to FIGS. 1-7, there is depicted an exemplary embodiment of a wheelbarrow having an assisted lift dumping barrow, generally designated 10 ("assisted lift dumping wheelbarrow 10"), fashioned in accordance with the present principles. The assisted lift dumping wheelbarrow 10 is designed to provide easy dumping of the contents of its barrow 13 through an assisted barrow lift system 12 as described herein. The assisted barrow lift system 12 forwardly and upwardly tilts the barrow 13 relative to a frame 14 of the assisted lift dumping wheelbarrow 10.

Figure 2:
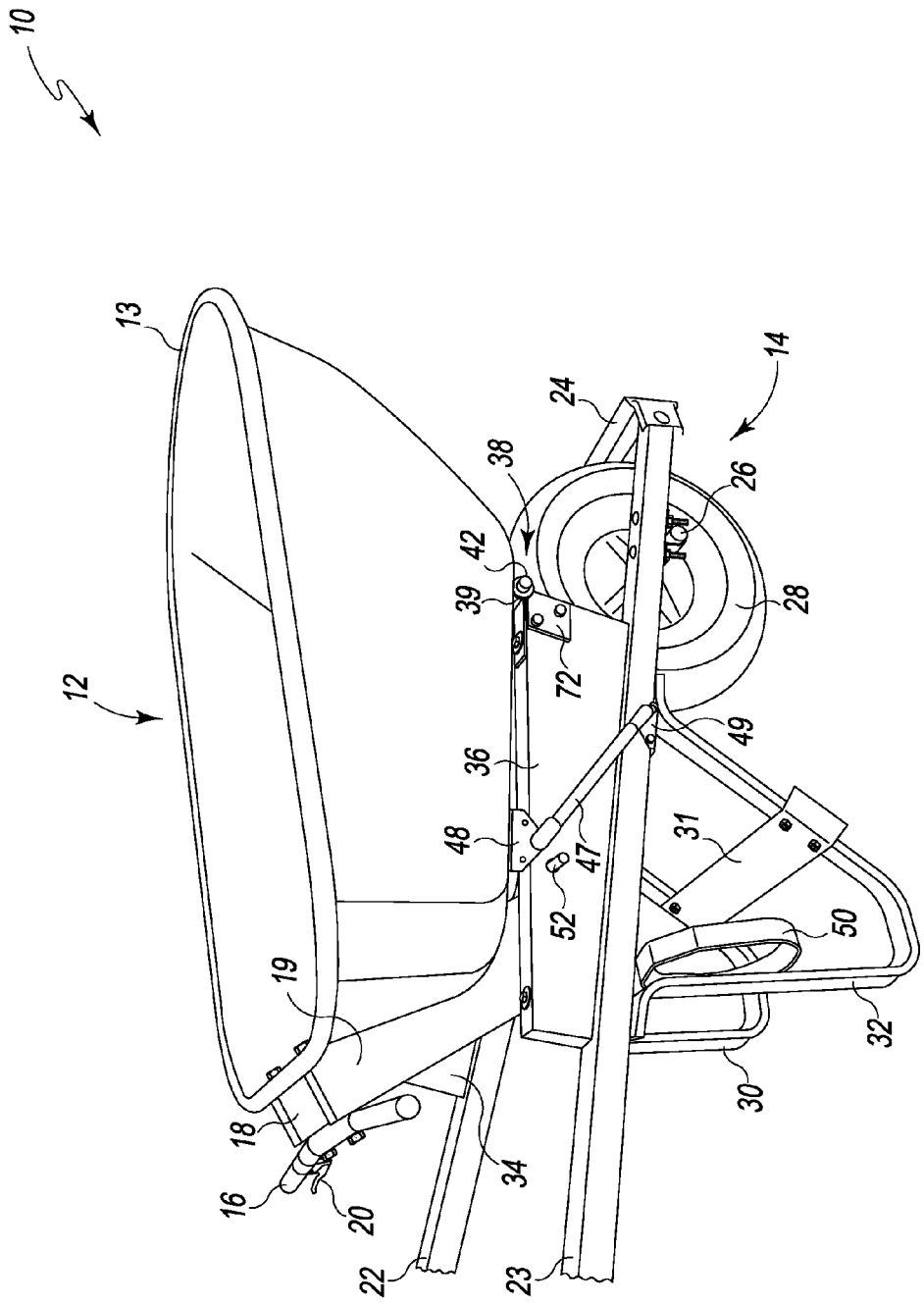
FIG. 2 is an isometric view of the right side of the wheelbarrow with the assisted lift dumping barrow of FIG. 1.

FIGS. 1 and 2 show respectively left side and right side views of the assisted lift dumping wheelbarrow 10 (per the perspective of a user at the rear of the wheelbarrow). The assisted lift dumping wheelbarrow 10 has a frame 14 that supports the barrow 13 and includes the assisted barrow lift system 12. The frame 14 has a left side arm 22 and a right side arm 23 that each extend from a front connector 24 to become left and right wheelbarrow handles. The left and right side arms may be any type of material such as wood, plastic or metal. Likewise, the front connector 24 may also be any type of material such as wood, plastic or metal. Preferably, however, but not necessarily, the front connector 24 is metal while the left and right side arms 22, 23 are wood. An axle 26 is supported on and between the left and right side arms 22, 23 at a front of the assisted lift dumping wheelbarrow 10 proximate the front connector 24. The axle 26 rotatably supports a wheel (e.g. tire) 28.

A left leg 30 extends downwardly from the left side arm 22 while a right leg 32 extends downwardly from the right side arm 23. A brace 31 is connected to and extends between the left and right legs 30, 32. As is typical of wheelbarrows in general and best seen in FIG. 7, the left and right legs 30, 32 are dimensioned such that the left and right arms 22, 23 slant upwardly from the wheel 28 when the left and right legs 30, 32 are resting on the ground.

Figure 5:
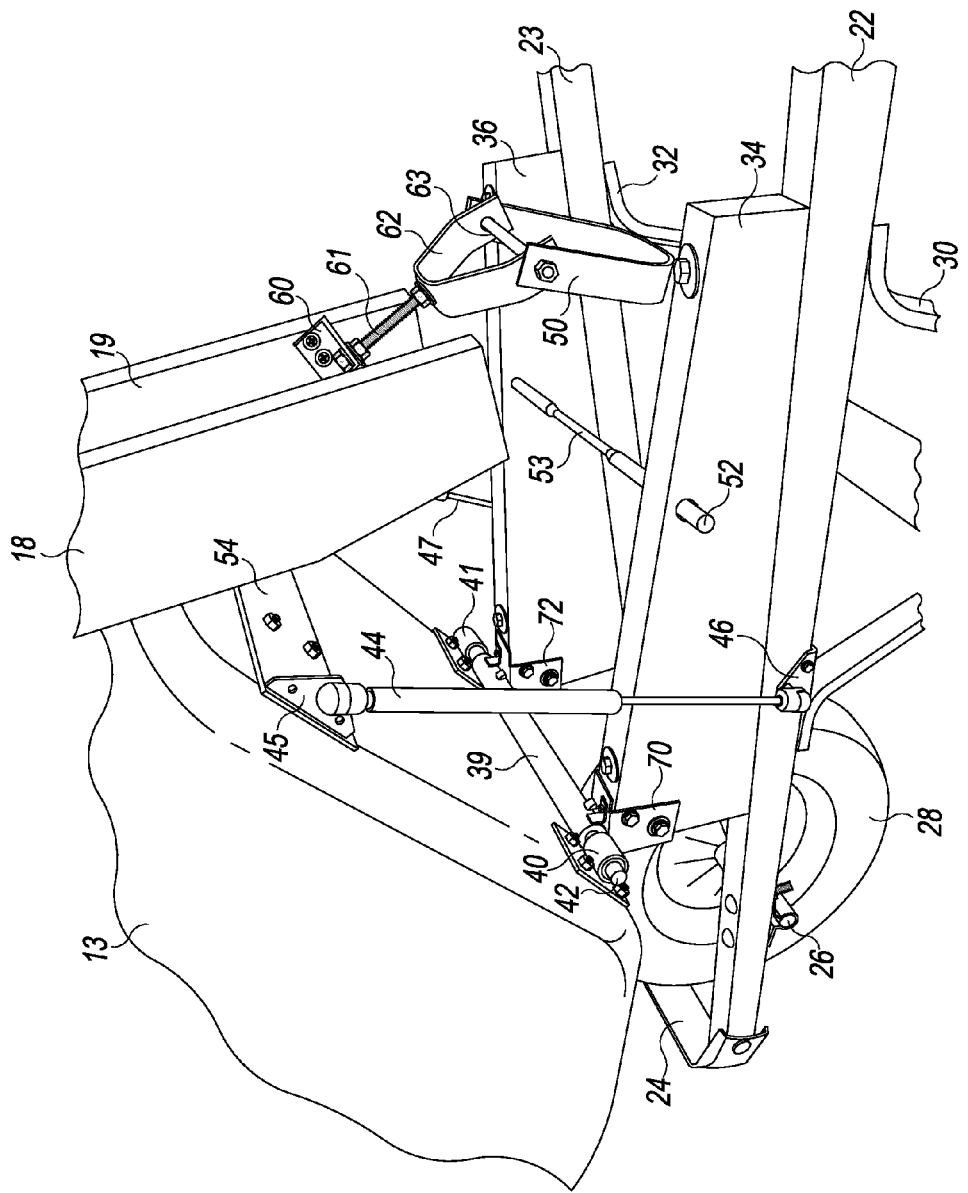
FIG. 5 is an isometric view of a close-up of the left side of the wheelbarrow with the assisted lift dumping barrow of FIG. 1 with the barrow in a pivoted into a dumping position.
Figure 6:
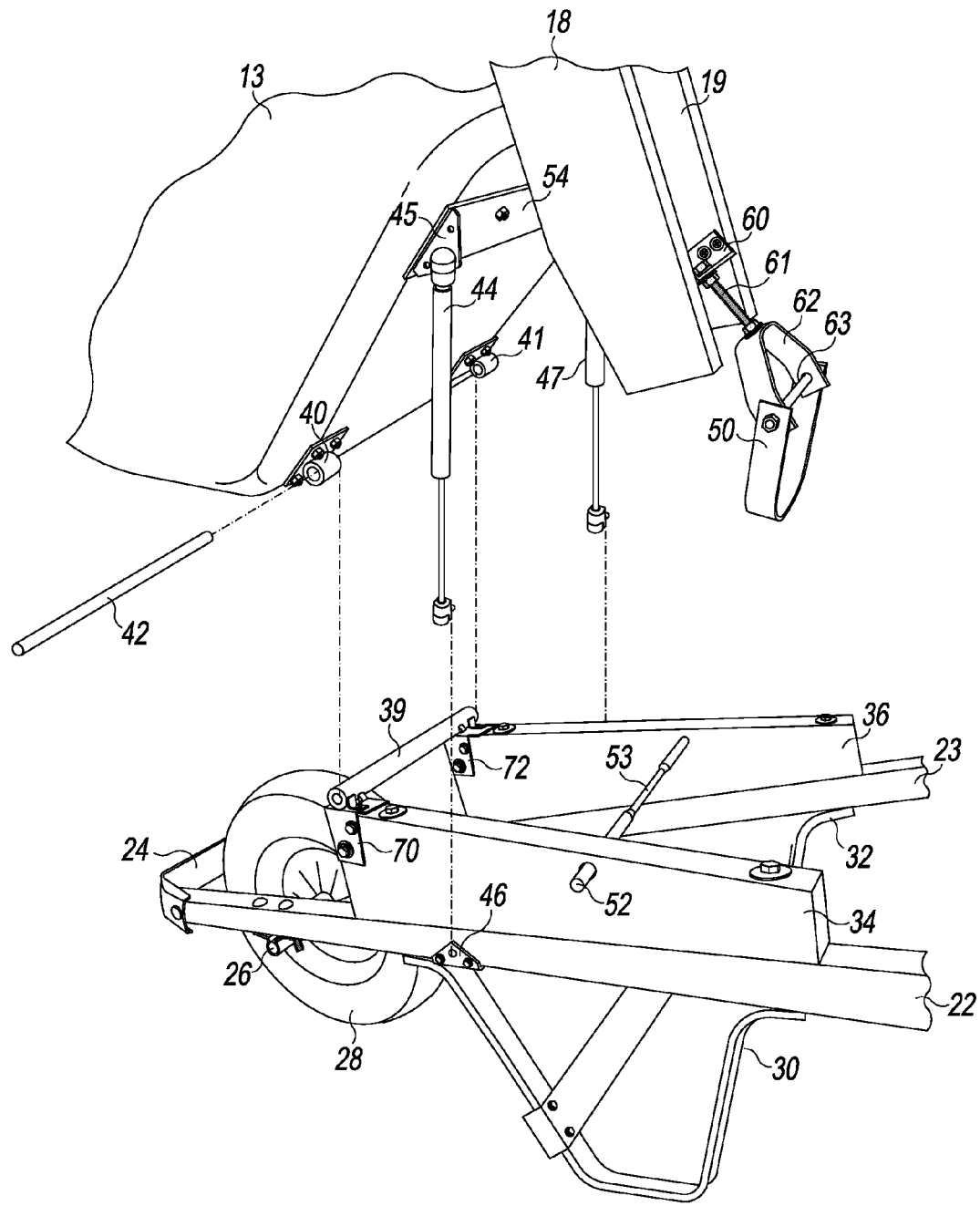
FIG. 6 is an isometric exploded view of the wheelbarrow with the assisted lift dumping barrow, particularly illustrating the pivotal attachment of the barrow to the frame.

The left side arm 22 holds a left barrow support 34 while the right side arm 23 holds a right barrow support 36. The left barrow support 34 is wedge shaped having its taller end proximate the wheel 28 and thus its shorter end distal the wheel 28. Likewise, the right barrow support 36 is wedge shaped having its taller end proximate the wheel 28 and thus its shorter end distal the wheel 28. The wedge shape of the left and right barrow supports 34, 36 holds the barrow, and more particularly the bottom of the barrow, generally level with the ground (see, e.g. FIG. 7) by counteracting the upward slant of the left and right side arms 22, 23 relative to the wheel 28. As best seen in FIGS. 5 and 6, a left hinge or pivot rod bracket 70 is provided at the taller end of the left barrow support 34, while a right hinge or pivot rod bracket 72 is provided at the taller end of the right barrow support 36. A pivot rod tube 39 is connected at one end to the left hinge 70 and at the other end to the right hinge 72 such that the tube 39 extends between the left and right barrow supports 34, 36.

As best seen in FIGS. 5 and 6, a left side tubular bracket 40 is attached to the front left underside of the barrow 13, while a right side tubular bracket 41 is attached to the front right underside of the barrow 13. The left side tubular bracket 40 is positioned on the underside of the barrow 13 such that its tube is coaxial with the longitudinal axis of the pivot rod tube 39 and axially outward thereof. Likewise, the right side tubular bracket 41 is positioned on the underside of the barrow 13 such that its tube is coaxial with the longitudinal axis of the pivot rod tube 39 and axially outward thereof. A longitudinal pivot rod 42 extends through the tubes of the left and right tubular brackets 40, 41 of the barrow 13 and the longitudinal pivot rod tube 39 of the frame 14. As shown in the figures, this arrangement allows the barrow 13 to pivot from an un-pivoted position (see e.g. FIGS. 1, 2, and 7) relative to the frame 14 through a fully pivoted or tilted position (see FIG. 7). Particularly, the front end of the barrow 13 pivots about the front portion of the frame 14 such that the rear end of the barrow 13 can tilt upwardly while the front end of the barrow 13 tilts downwardly. The forward slant of the barrow 13 dumps the contents of the barrow 13.

In accordance with the principles of the present invention, as part of the assisted barrow lift system 12, a left side biasing member 44 is provided at a left side of the wheelbarrow, while a right side biasing member 47 is provided at a right side of the wheelbarrow. Each biasing member provides a normally outwardly bias or force particularly, but not necessarily, of the same biasing strength. The amount of outward bias or force depends on several factors such as, but not limited to, the weight of the barrow, the weight of anticipated loads, and the ability of a user to overcome the bias when lowering the rear of the barrow from a raised position to a lowered position. Biasing members having sixty pounds (60 lbs.) of compression have been successfully used.

In a preferred form, the left side biasing member is a gas spring 44 (e.g. a telescoping gas spring such as known in the art) that is removably and pivotally connected at its lower end to the left side arm 22 via a lower left connection bracket 46, and removably and pivotally connected at its upper end to the left rear underside of the barrow 13 via an upper left connection bracket 45. The right side gas spring 47 (e.g. a telescoping gas spring such as known in the art) is removably and pivotally connected at its lower end to the right side arm 23 via a lower right connection bracket 49, and removably and pivotally connected at its upper end to the right rear underside of the barrow 13 via an upper right connection bracket 48. Preferably, but not necessarily, a reinforcing strip 54 is mounted to or part of the underside of the barrow 13 from the left to right side thereof. The upper left and right connections brackets 45, 49 would therefore be attached to the reinforcing strip 54, otherwise directly to the underside of the barrow 13. Other types of biasing members may be used.

If the barrow 13 is not restrained, the left and right side gas springs 44, 47 normally upwardly bias against the rear underside of the barrow 13 to upwardly push the rear of the barrow 13 to forwardly pivot the barrow. Since there are two gas springs each located at sides of the barrow 13, there is equal balance upon the underside of the barrow 13. This helps prevent sideways tilting of the barrow 13 during dumping. Moreover, this equal balance aids in helping the user maintain dumping control of the wheelbarrow 10. In order to prevent the barrow from normally being biased into a dumping position, a latch or latching system is provided that retains the rear of the barrow 13 until released.

Figure 3:
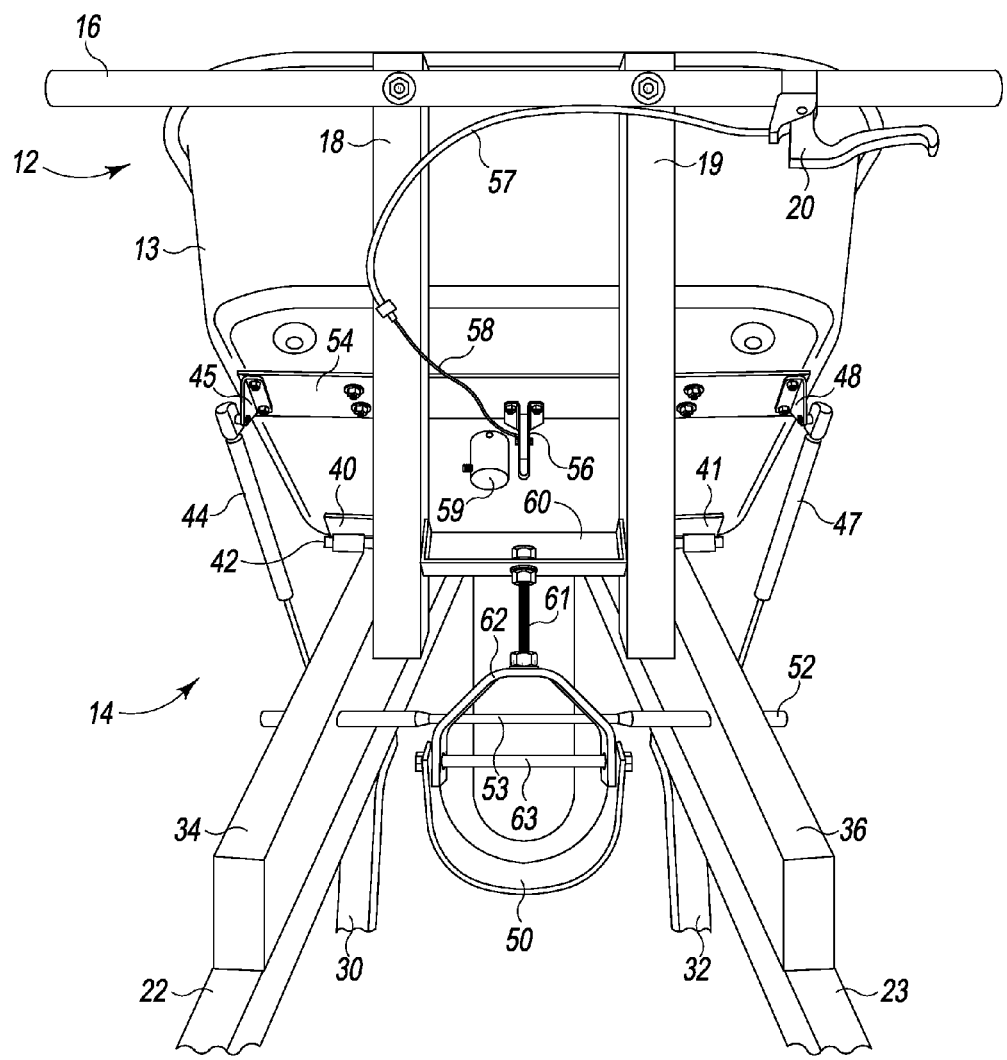
FIG. 3 is an isometric rear view of the wheelbarrow with the assisted lift dumping barrow of FIG. 1 with the barrow pivoted forwardly.
Figure 4:
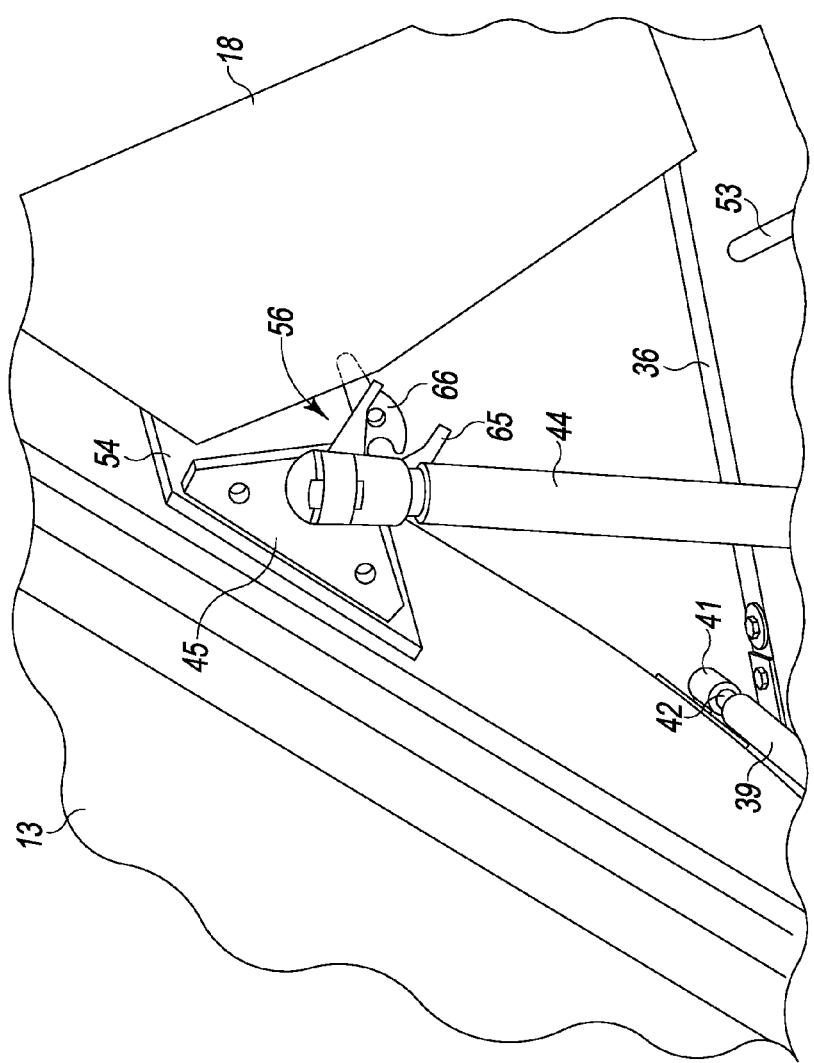
FIG. 4 is an enlarged isometric view of a portion of the left side of the wheelbarrow with the assisted lift dumping barrow of FIG. 1 wherein the barrow is pivoted forwardly particularly showing attachment of a left side biasing member to the lower left side of the barrow and a spring-loaded latch attached to the bottom of the barrow.

Particularly, a latch 56 is provided on the underside of the barrow 13 preferably, but not necessarily, located at a midpoint between the upper left connection bracket 45 for the left side gas spring 44 and the upper right connection bracket 48 for the right side gas spring 47. Referring to FIGS. 3 and 4, the latch 56 is easily seen. The latch 56 includes a reception hook 65 and a spring-loaded arm 66 that is configured to hook onto and hold a retention bar 52 that is held by and extends between the left barrow support 34 and the right barrow support 36. Preferably, but not necessarily, the retention bar 52 has a reduced diameter portion 53 at the middle of the retention bar 52 that is sized to be received by the latch 56.

The spring-loaded latch 56 is connected to a release mechanism that is controlled by the user. Particularly, the spring-loaded latch 56 is connected to a cable 58 within a sheath 57 that is in turn connected to an actuation lever 20. A weight 59 may be attached to the cable 58 for aiding in latching and releasing the latch. The actuation lever 20 is coupled to a handle 16 associated with the barrow 13. The handle 16 spans the length of the rear end of the barrow 13 and allows the user to control the barrow 13, especially during dumping of the barrow 13 and returning the barrow 13 into the latched position. The handle 16 is attached at a left side thereof to a left vertical support 18 and at a right side thereof to a right vertical support 19. The left and right side vertical supports 18, 19 extend generally from the top or rim of the barrow 13 to below the bottom or underside of the barrow 13. In a latched position, wherein the rear of the barrow 13 is retained on the frame 14 (e.g. as in FIGS. 1 and 2), the spring-loaded arm 66 of the latch 56 is normally biased to engage the rod portion 53, thereby holding down the rear of the barrow 13 against the upward bias of the left and right side gas springs 44, 47. Movement of the actuation lever 20 pulls the cable 58 within the sheath 57 to unlatch the latch 56.

The dumping wheelbarrow 10 may optionally include a mechanism that allows the user to use their foot in addition to using the handle 16 of the barrow 13 in order to lower the rear end of the barrow 13 from a dumping position to a closed, lowered, or latched position. Because the rear of the barrow 13 is biased upwardly by the left and right side gas springs 44, 47, pressure needs to be exerted against this bias in order to lower the rear end of the barrow 13. While this may be accomplished solely through the handle 16 of the barrow 13, a pedal or stirrup 50 is provided. The pedal 50 is preferably as shown, but not necessarily, attached to a yoke 62 via a pivot rod 63 to allow the pedal 50 to swing freely about the pivot rod 63 to accommodate different foot orientations during use. The yoke 62 is in turn suspended via a connecting rod 61 to a cross member 60 which is connected to and extends between the left vertical support 18 and the right vertical support 19. The yoke 62 is preferably as shown, but not necessarily, adjustable relative to the connecting rod 61 and thus the cross member 60 to allow for user adjustment.

Figure 7:
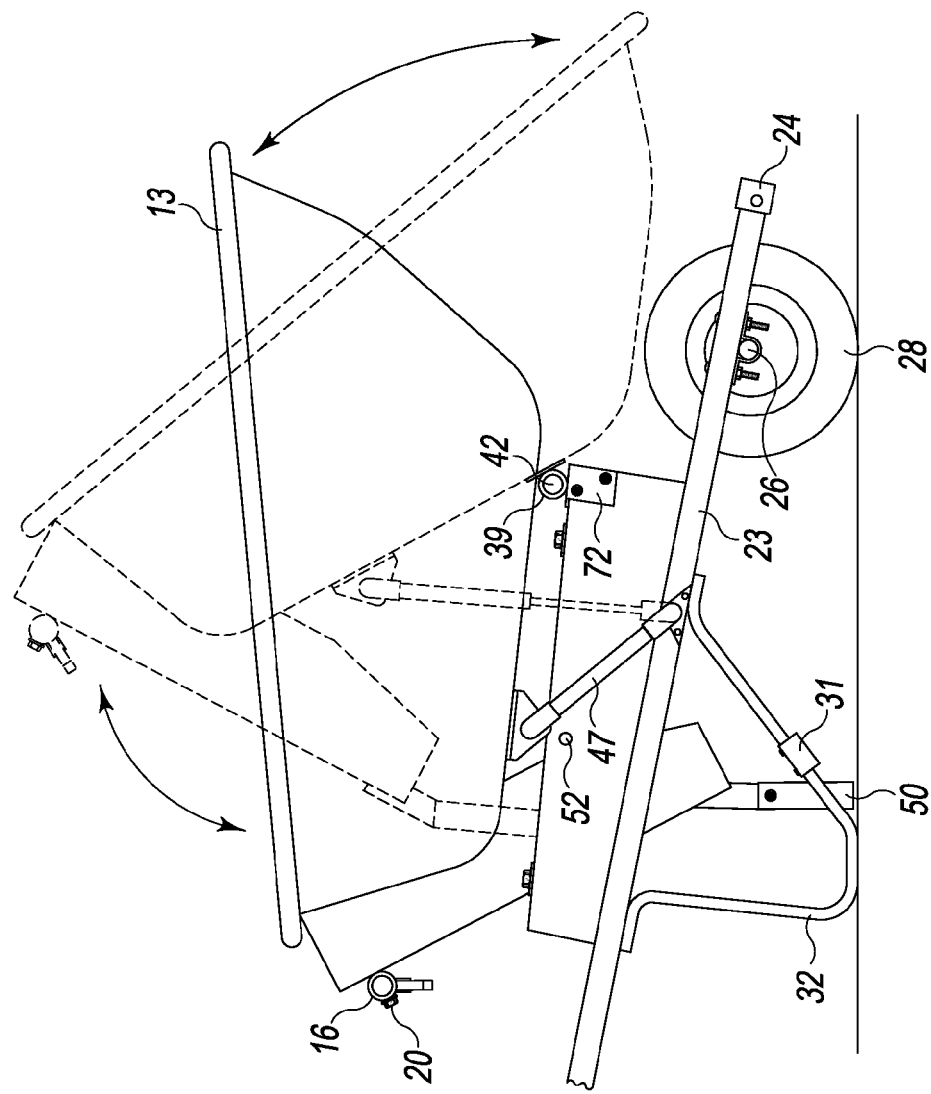
FIG. 7 is a right side elevation view of the wheelbarrow with the assisted lift dumping barrow of FIG. 1 illustrating the pivoting/forward tilt motion of the barrow relative to the frame during dumping of the contents of the barrow.

FIG. 7 shows the barrow 13 of the dumping wheelbarrow 10 in its latched position wherein the rear of the barrow 13 is held onto the frame 14, and an unlatched position wherein the rear of the barrow 13 is elevated from the frame 14. In the latched, non-dumping, lowered, loading, or transportation position, the bottom of the barrow 13 is generally parallel with respect to the left and right side arms 22, 23. In the un-latched, dumping, pivoted, raised, unloading, or non-transportation position, the bottom of the barrow 13 is vertical with respect to the left and right side arms 22, 23. The two-headed arrows illustrate the movement of the barrow 13 during pivoting of the barrow 13 when the barrow 13 goes from the latched position to the un-latched position and vice versa.

While the invention has been illustrated and described in detail in the drawings and foregoing description, the same is to be considered as illustrative and not restrictive in character, it being understood that preferred embodiments have been shown and described and that all changes and modifications that come within the spirit of the invention are desired to be protected.

What is claimed is:

1. A wheelbarrow comprising:
    a frame having:
        a left side arm having a left front end and a left rear end, the left rear end defining a left side wheelbarrow handle;
        a right side arm having a right front end and a right rear end, the right rear end defining a right side wheelbarrow handle;
        a front frame member connected to and between the left front end of the left side arm and the right front end of the left side arm;
    a left barrow support situated on the left side arm;
    a right barrow support situated on the right side arm;
    an axle carried by and between the front frame member and the left and right barrow supports;
    a wheel rotatably supported on the axle;
    a left leg extending downwardly from the left side arm;
    a right leg extending downwardly from the right side arm;
    a barrow pivotally connected at a front underside thereof to and between a front end of the left barrow support and the front end of the right barrow support, the barrow having a lowered position wherein the underside of the barrow rests on the left and right barrow supports, and a raised position wherein the rear end of the barrow is elevated and tilted relative to the front end of the barrow;
    a left side biasing member connected to and between a left rear underside of the barrow and the left side arm of the frame, the left side biasing member providing an outward bias against the left rear underside of the barrow and the left side arm of the frame;
    a right side biasing member connected to and between a right rear underside of the barrow and the right side arm of the frame, the right side biasing member providing an outward bias against the right rear underside of the barrow and the right side arm of the frame;
    a retention rod connected to and between the left barrow support and the right barrow support; and
    a releasable latch mounted to the rear underside of the barrow between where the left side biasing member connects to the left side arm of the frame and where the right side biasing member connects to the right side arm of the frame, the releasable latch capturing the retention rod when the barrow is in the lowered position and free of the retention rod when the barrow is in the raised position;
    the left and right side biasing members through their normally outward biasing against the left and right rear undersides of the barrow and the left and right side arms of the frame exerting a force against the left and right rear undersides of the barrow to automatically move the barrow from the lowered position to the raised position for dumping contents of the barrow when the releasable latch is free of the retention rod.

2. The wheelbarrow of claim 1, wherein:
    the left side biasing member comprises a gas spring; and
    the right side biasing member comprises a gas spring.

3. The wheelbarrow of claim 2, wherein:

the left side gas spring is pivotally connected to a lower left mounting bracket attached to the left side arm, and pivotally connected to an upper left mounting bracket attached to the left rear underside of the barrow; and the right side gas spring is pivotally connected to a lower right mounting bracket attached to the right side arm, and pivotally connected to an upper right mounting bracket attached to the right rear underside of the barrow.

4. The wheelbarrow of claim 3, wherein:

the left side gas spring is releasably connected to the lower left mounting bracket of the left side arm, and releasably connected to the upper left mounting bracket of the underside of the barrow; and the right side gas spring is releasably connected to the lower right mounting bracket of the right side arm, and releasably connected to the upper right mounting bracket of the right rear underside of the barrow.

5. The wheelbarrow of claim 2, further comprising:

a handle attached to an upper rear end of the barrow.

6. The wheelbarrow of claim 5, wherein:

the left barrow support has a front end of a first height, and a rear end of a second height that is less than the first height; and the right barrow support has a front end of the first height, and a rear end of the second height.

7. The wheelbarrow of claim 5, further comprising:

an actuation lever attached to the barrow handle; and actuation cabling connecting the actuation lever and the releasable latch;

wherein manipulation of the actuation lever causes the actuation cabling to either latch or release the releasable latch.

8. The wheelbarrow of claim 7, further comprising:

a foot lever connected to the rear of the barrow and configured to allow a user to lower a raised barrow.

9. The wheelbarrow of claim 8, further comprising:

a left vertical support mounted to the rear of the barrow;

a right vertical support mounted to the rear of the barrow;

a cross member connected to and extending between a lower portion of the left vertical support and a lower portion of the right vertical support; and the foot lever comprising:

a connector extending from the cross member;

a yoke attached to the connector; and a stirrup pivotally connected to the yoke.

* * * * *